UNITED STATES PATENT OFFICE.

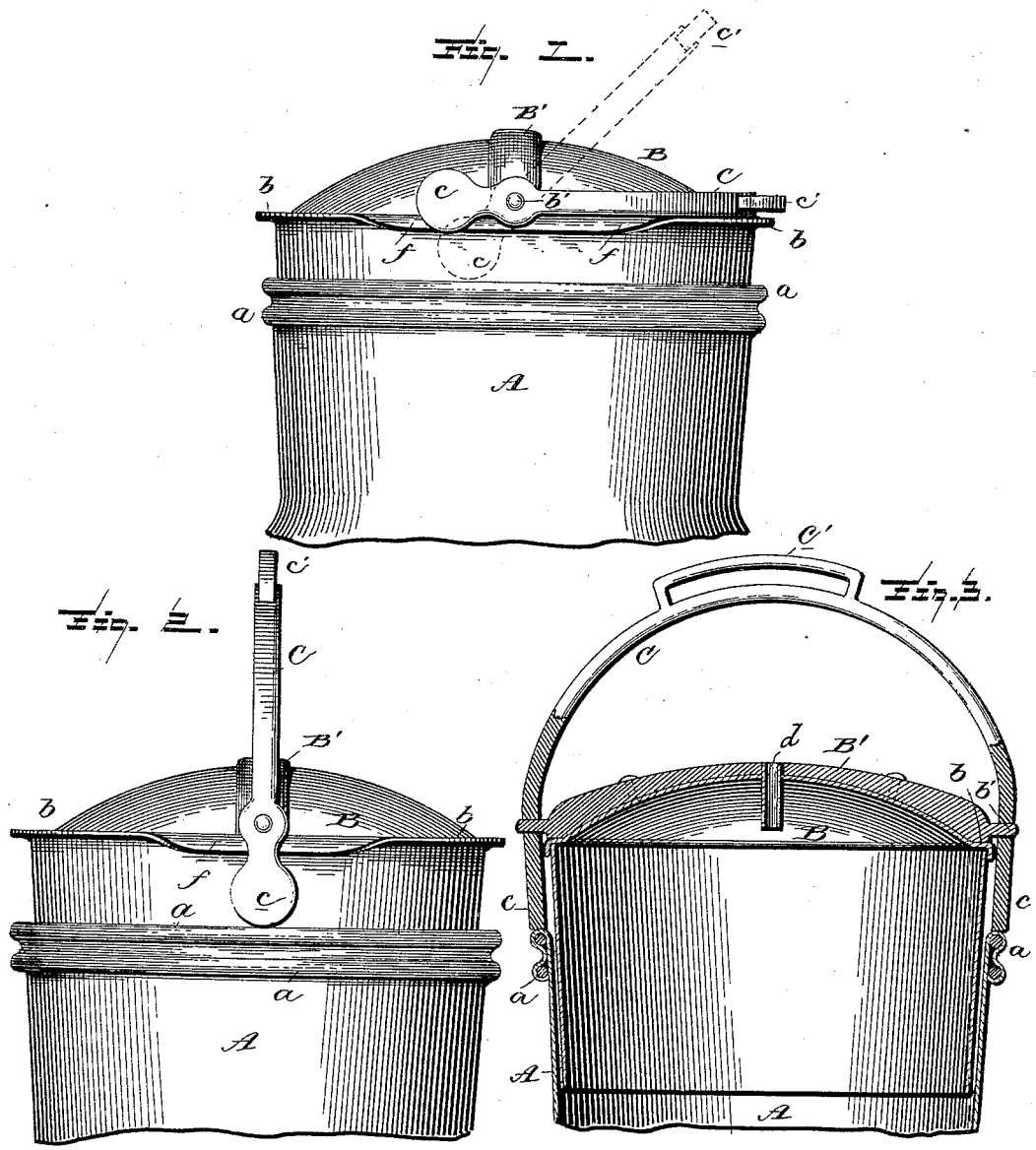

DANIEL H. FLIEHR, OF COOPERSBURG, PENNSYLVANIA.

LID-LIFTER.

SPECIFICATION forming part of Letters Patent No. 433,726, dated August 5, 1890.

Application filed March 26, 1890. Serial No. 345,316. (No model.)

*To all whom it may concern:*

Be it known that I, DANIEL H. FLIEHR, a citizen of the United States, residing at Coopersburg, in the county of Lehigh, State of Pennsylvania, have invented certain new and useful Improvements in Lid-Lifters, of which the following is a specification, reference being had therein to the accompanying drawings.

This invention relates to certain new and useful improvements in lid-lifters for cans and other vessels; and it has for its object among others, to provide a can-lid with devices whereby the lid is raised as the handle of the said lid is elevated.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a side view of a portion of a can with the lid in place with the handle to the lid down, but shown in dotted lines in the position it assumes just as it commences to come into play to raise the lid. Fig. 2 is a like view with the handle raised. Fig. 3 is a central vertical section through Fig. 2.

Like letters of reference indicate like parts throughout the several views.

Referring now to the details of the drawings by letter, A designates the upper portion or neck of a can or other vessel, the upper edge of which is beaded and provided with a wire or wires $a$, as shown in Fig. 3, for strengthening the said upper edge to enable it to withstand the pressure exerted by the handle of the lid when the same is actuated to raise the lid.

B is the lid, having a depending flange or rim adapted to fit within the neck of the can and with an outwardly extending rim $b$. This lid is re-enforced across its center upon its upper face by means of the strip B', which at its ends is extended beyond the sides of the lid to form pintles $b'$, on which the handle is pivoted, as shown best in Fig. 3. This strip is secured to the lid in any suitable manner and may sometimes be dispensed with, the handle being pivoted to the lid in any other suitable manner. This handle C is, as above described, pivotally connected with the lid, and at its ends extended below the pivots and rounded, as shown at $c$. The handle is formed with a loop $c'$, (shown best in Fig. 3,) which, when the handle is down, as shown in Fig. 1, will project beyond the edge of the can and lid and form a convenient hand-hold, whereby the handle may be easily grasped by the hand. The lid is preferably provided with a vent-tube $d$, as shown in Fig. 3.

In practice the lid is pressed home with the handle turned down, as shown in full lines in Fig. 1. When it is desired to remove the lid, a sudden jerk upon the handle upward, as shown by dotted lines in Fig. 1, causes the rounded extensions of the handle to engage the rim at the upper edge of the neck of the can and pries the lid off. The rim $b$ of the lid is turned downward, as shown at $f$, at diametrically-opposite sides to allow of easy movement of the handle.

What I claim as new is—

1. The combination, with a can and its lid, of a lever pivotally connected with the lid and engaging the can to raise the lid, substantially as specified.

2. The combination, with a can and a lid therefor, of a handle pivoted on the lid and having portions extending beyond the pivots and engaging the upper edge of the can, as set forth.

3. The combination, with a can and its lid, the upper edge of the can being provided with a strengthening-wire, of a handle pivoted on the lid and having portions extending beyond the pivots and engaging the upper edge of the can, substantially as specified.

4. The combination, with a can and its lid, of the handle pivoted thereto and having its ends extended beyond the pivots and rounded and adapted to engage the upper edge of the can when the handle is brought to a vertical position, substantially as specified.

5. The combination, with a can and its lid, of a strengthening-piece affixed to the lid and formed with oppositely-extending pintles, and a handle pivoted on said pintles and adapted to engage the upper edge of the can, as set forth.

6. The combination, with the can and its lid provided with a rim flattened upon opposite sides of the lid, of the handle pivoted on the lid opposite said flattened portions and adapted to engage the upper edge of the can, as set forth.

7. A can-lid having pivoted thereto a handle provided with rounded portions extended beyond the pivots, substantially as specified.

In testimony whereof I affix my signature in presence of two witnesses.

DANIEL H. FLIEHR.

Witnesses:
 THOMAS STEPHENS,
 JAMES J. GEISINGER.